A. SIMMONS.
Hand Seeder.
No. 21,780.
Patented Oct. 12, 1858.
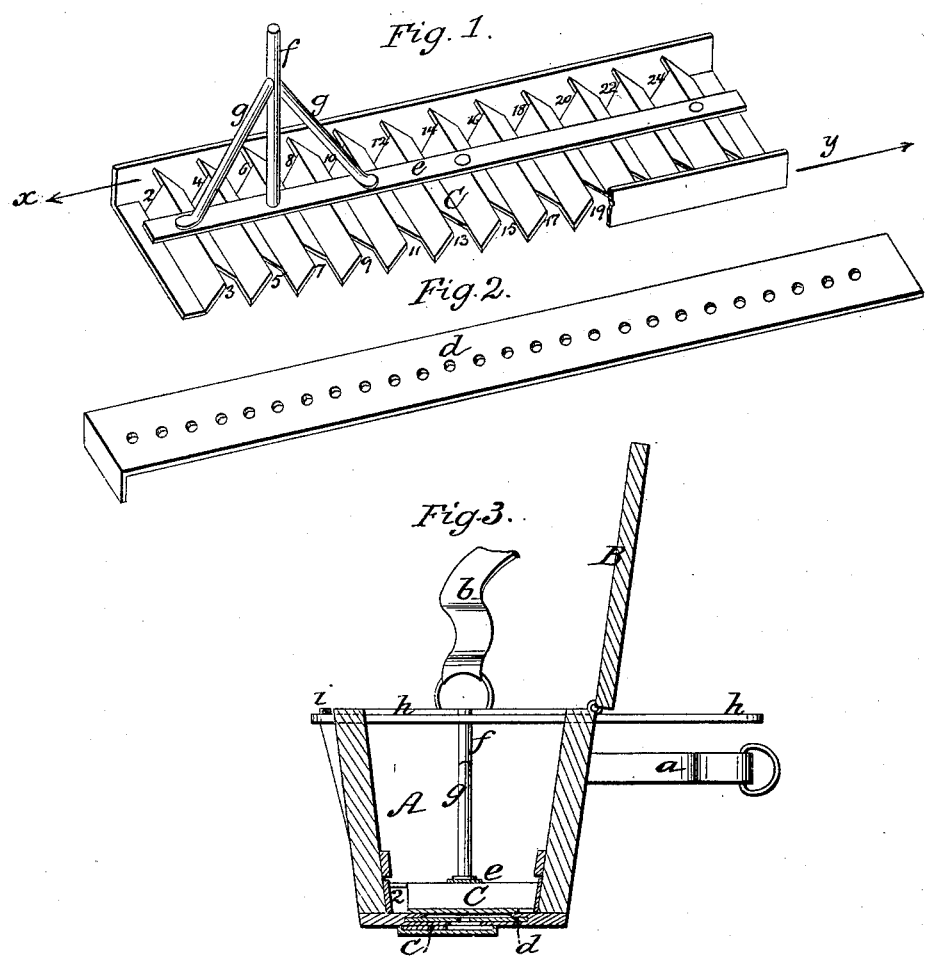

UNITED STATES PATENT OFFICE.

ANDREW SIMMONS, OF NORA, ILLINOIS.

IMPROVEMENT IN SEEDING-MACHINES.

Specification forming part of Letters Patent No. 21,780, dated October 12, 1858.

*To all whom it may concern:*

Be it known that I, ANDREW SIMMONS, of Nora, in the county of Jo Daviess and State of Illinois, have invented certain new and useful Improvements in Seed-Planters; and I do hereby declare the following to be a full, clear, and exact description of the construction and operation of the same, reference being had to the accompanying drawings, making a part of this specification, in which—

Figure 1 represents a perspective view of the seed-slide removed from the seed box or hopper. Fig. 2 represents in perspective one of the perforated plates that form the bottom of the hopper. Fig. 3 represents a vertical cross-section through the hopper and seeding devices.

My invention relates to that class of seed-sowers known as "broadcast-machines," as contradistinguished from drilling-machines; and it consists in making the "seed-slide," as it is termed, of a corrugated form, with seed-openings at its edges, and on opposite sides of its ridges or corrugations, so that the grain is carried from hopper at both motions of the slide, but will not waste out when the slide is at rest.

To enable others skilled in the art to make and use my invention, I will proceed to describe the same by reference to the drawings.

A represents a hopper or seed box arranged to be carried by the user, with a body-support, $a$, and a shoulder-strap, $b$, and furnished with a door or lid, B. Through the bottom of the hopper lengthwise there is an opening, over which a slide, $c$, may be moved when it is necessary to close the hopper.

$d$, Fig. 2 and in red lines in Fig. 3, represents a perforated plate, which slides in from the end of the hopper and covers the opening in the bottom of the hopper, and its openings or holes regulate the quantity of seed or grain that is to be sown. Several of these plates with different-sized openings may be provided, so as to suit the different qualities or quantities of seed to be sown.

On the bottom of the hopper, on the inside, is what is known as the "seed-slide," C. It may be made of a corrugated plate which is sufficiently light and strong for the purpose, and is furnished with openings 2 4 6 8, &c., and 3 5 7 9, &c., these openings being on the alternate sides or ridges of the corrugations, so that whichever way the slide is reciprocated, one or the other of these sets of openings will catch and force the grain through them, and thus feed it from the hopper to and through the perforated plate $d$ to the ground.

To the seed-slide C (or to a bar, $e$, connected to it) there is fastened a rod, $f$, suitably braced, as at $g$, and over the top of this rod $f$, so to connect with it, passes a lever, $h$, pivoted at $i$ to the hopper, so that the operator by working the lever $h$ to and fro reciprocates the seed-slide C, and thus sows the seed broadcast. For the convenience of cleaning the hopper or removing or replacing the seed-slide, I make one of the ends of the hopper removable.

I have described and shown the hopper as stationary and the slide as movable. It is obvious that what is called the "slide" may be stationary and the hopper movable and still effect the same object; or the hopper and slide may be connected together and both reciprocate over the perforated plate or bottom, inasmuch as the openings in the ridges or corrugations will catch and carry through the grain or seeds, whether they work with or against each other, though the easier plan is to move the slide, its holes 2 4 6 8, &c., taking through the grain when it moves in the direction of the red arrow $x$ and those 3 5 7 9, &c., taking it through when it moves in the direction of the arrow $y$.

Having thus fully described the nature and operation of my seeding-machine, what I claim therein as new, and desire to secure by Letters Patent, is—

Forming the seed-slide of a corrugated plate and making the seed-openings therein at the edges and on opposite sides of the ridges or corrugations, substantially in the manner and for the purpose set forth.

ANDREW SIMMONS.

Witnesses:
  A. B. STOUGHTON,
  THOS. H. UPPERMAN.